Feb. 18, 1964  J. O. TURNER  3,121,557
CABLE PULLER
Filed Oct. 25, 1960  8 Sheets-Sheet 2

INVENTOR
James O. Turner,
BY
Diggins & LeBlanc
ATTORNEYS

Feb. 18, 1964     J. O. TURNER     3,121,557
CABLE PULLER

Filed Oct. 25, 1960     8 Sheets-Sheet 5

INVENTOR

James O. Turner,

BY Diggins & Le Blanc

ATTORNEYS

Feb. 18, 1964  J. O. TURNER  3,121,557
CABLE PULLER

Filed Oct. 25, 1960  8 Sheets-Sheet 7

INVENTOR
James O. Turner;

BY  Diggins + Le Blanc
ATTORNEYS

Feb. 18, 1964   J. O. TURNER   3,121,557
CABLE PULLER
Filed Oct. 25, 1960   8 Sheets-Sheet 8
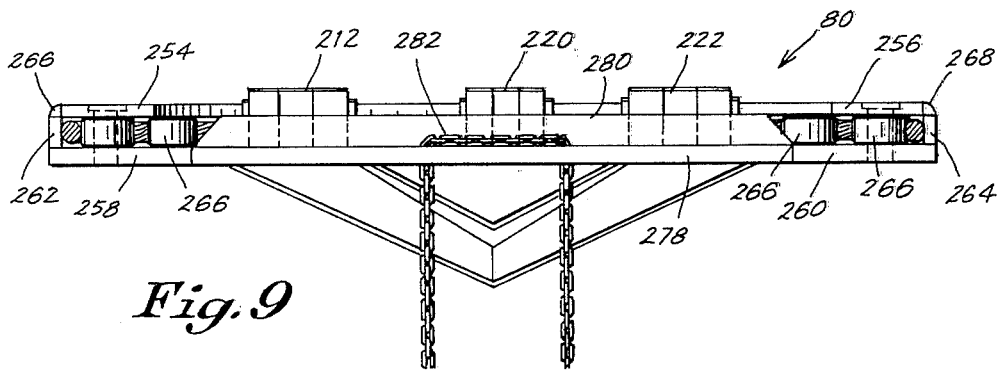
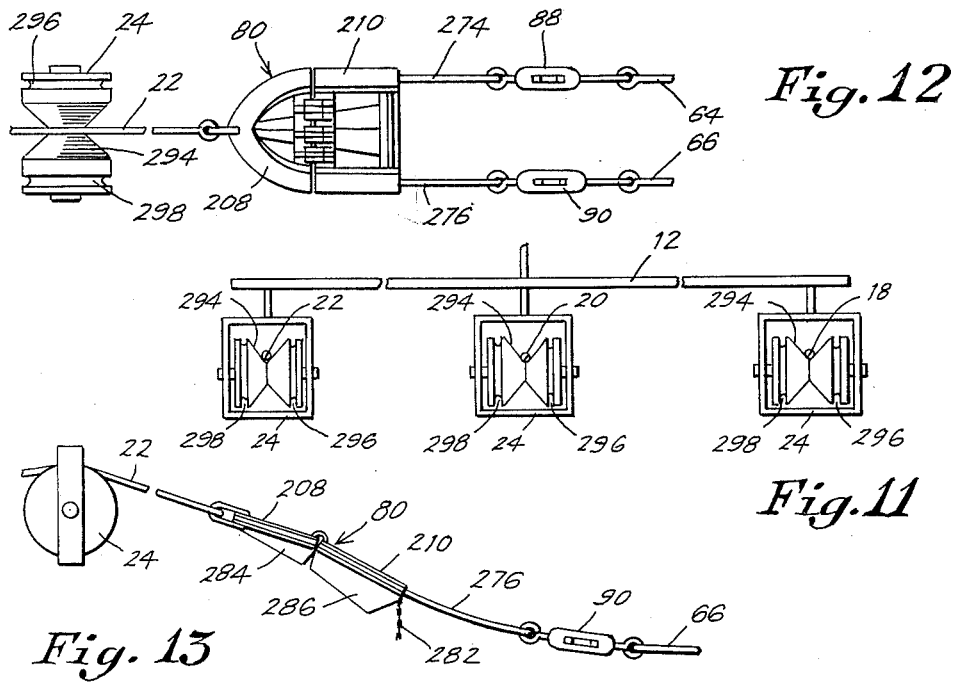
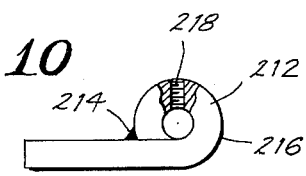
INVENTOR
James O. Turner,
BY Diggins & Le Blanc
ATTORNEYS United States Patent Office 3,121,557
Patented Feb. 18, 1964

3,121,557
CABLE PULLER
James O. Turner, Niagara Falls, N.Y., assignor to Emerson-Garden Electric Co., Inc., New York, N.Y., a corporation of New York
Filed Oct. 25, 1960, Ser. No. 64,858
6 Claims. (Cl. 254—134.3)

The present invention relates to pulling devices and more particularly to pulling devices in which speed may be varied by infinitely small increments over the entire speed range while maintaining a uniform torque or where torque can be varied through infinitely small increments over the entire torque range or where both speed and torque may be varied together.

It is to be understood that the present invention is applicable to all types of pulling requirements including such diverse uses as wire or plastic drawing, rope stretching, towing or the like. One particularly useful application of the present invention is in the stringing of high tension electric cable and consequently the invention will be described specifically for that particular use. It is to be understood, however, that this particular use is merely by way of example and is not to be construed as limitative.

For many years, the tendency in electrical transmission in the transmission of electric power has been to use higher and higher voltages because of the greater economies involved. The power cables involved are substantial in diameter, many of them being an inch in diameter and even more, and for reasons of economy, it is desirable to have the towers spaced apart as far as possible so as to minimize the number of towers required to cover a given distance. Much, if not all, of the high tension power used in this country is three-phase power and in order to obtain sufficient current carrying capacity without excessive losses, it is sometimes necessary to use two cables per phase.

At the high voltages in use today and the probably higher voltages which will be used in the future, extreme care is necessary to avoil abrading or otherwise damaging the power cable since abrasion or roughness on the cable surface could result in excessive corona losses. Also, for reasons which are well known, it is important to control the sag of the cable between towers so as to avoid too much tension in the cable or to permit the cable or cables or one phase to sag too close either to a cable or cables of another phase or to the ground.

A further problem involve in the stringing of high tension cable over widely spaced towers is that because of the great weight of the cable, all cables should be pulled simultaneously to maintain complete balance of load on each tower.

This requires, among other things, that the pulling device be able to start from a stopped position at full torque and to maintain that torque uniform throughout the entire range of pulling speed up to the maximum pulling speed of the apparatus to control and maintain uniform sag between towers. This also requires that torque may be varied at any given speed to tighten or slacken the cable and thus control its sag.

The specific embodiment described in the present invention is a more or less complex system by which it is possible to pull simultaneously six power cables over a distance of several miles at relatively high speed while closely controlling the sag between adjacent towers and preventing any abrasion or other damage to the cables.

It is therefore a primary object of the present invention to provide an improved cable puller.

Another object of the present invention is to provide an infinitely variable pulling device.

Another object of the present invention is to provide an arrangement for pulling electric cables in such a manner as to avoid cable abrasion.

Another object of the present invention is to provide a cable pulling rig wherein cable tension can be accurately controlled at all times.

Another object of the present invention is to provide an improved method for pulling cables.

Another object of this invention is to provide a novel pulling sled for cable pulling devices.

These and other objects and advantages of the invention will be more apparent upon reference to the following specification, claims and appended drawings wherein:

FIGURE 9 is a rear view of the pulling sled of FIGURES 7 and 8;

FIGURE 10 is an enlarged view, partly in section, showing the hinge construction for the sled of FIGURES 7–9;

FIGURE 11 shows a set of traveler blocks used in conjunction with the pulling system of the present invention;

FIGURE 12 illustrates a pulling sled moving over one of the traveler blocks of FIGURE 11; and FIGURE 13 is an elevational view of the structure shown in FIGURE 12.

Figure 1:
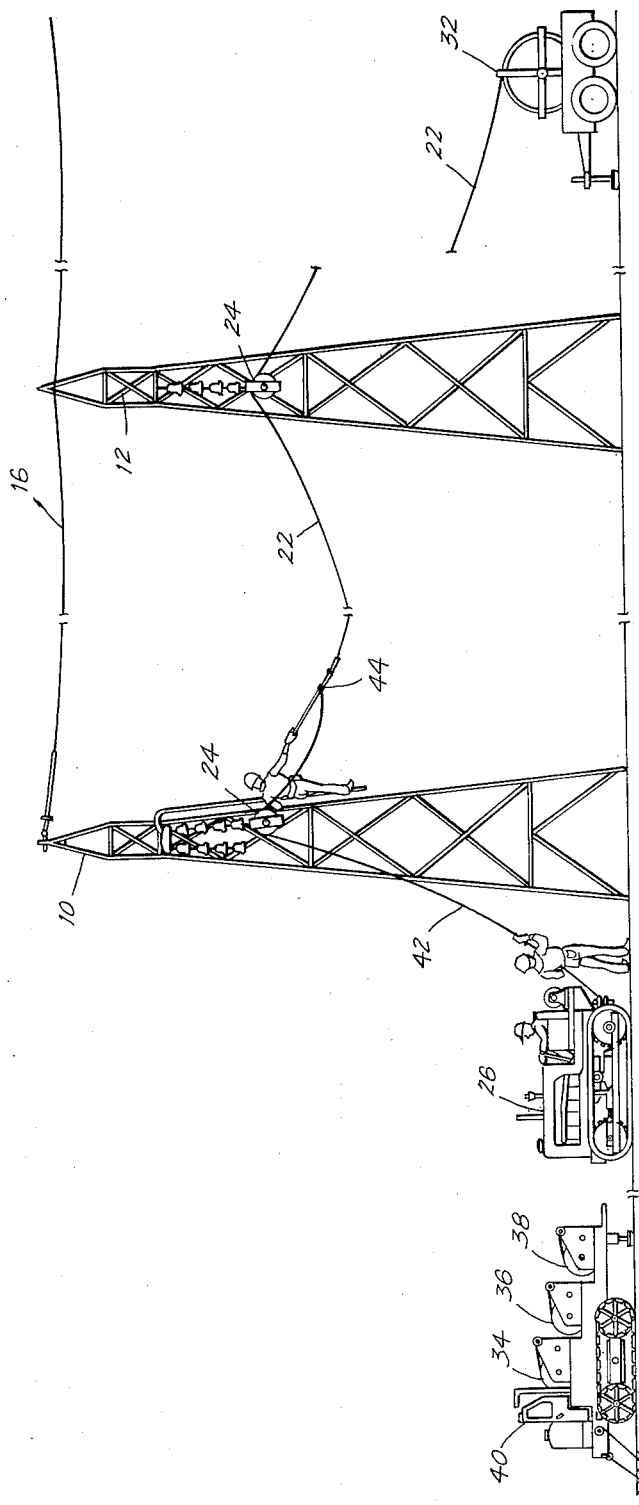
FIGURE 1 illustrates a preliminary step in the pulling system of the present invention illustrating a tractor arrangement for stringing the pulling line.

Referring to the drawings, FIGURE 1 illustrates a pair of towers 10 and 12 for supporting high voltage electrical cables. The towers carry at their extreme upper ends a pair of lightning arrestor or ground wires 14 and 16. In the preliminary step illustrated in FIGURES 1 and 2, three pulling lines 18, 20 and 22 are manually strung along the towers and pulled through the tower traveler blocks 24 by means of a tractor 26. Each of the pulling lines is drawn from a trailer mounted reel 28, 30 and 32.

Figure 2:
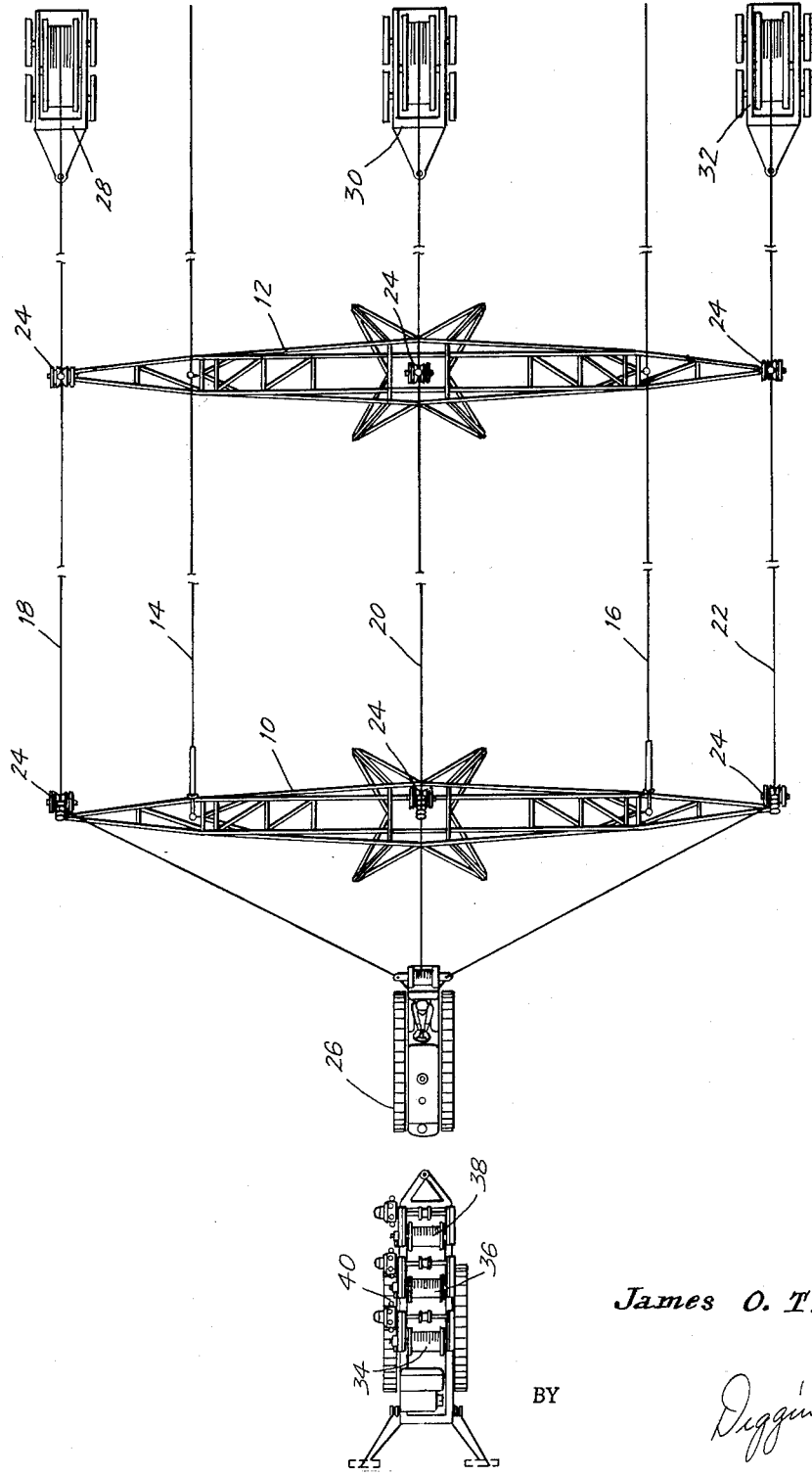
FIGURE 2 is a plan view of the arrangement shown in FIGURE 1 with the pulling line ready for attachment to the pulling machine.

While only two towers are illustrated in FIGURES 1 and 2, it is understood that the pulling lines are ordinarily strung through a series of several towers usually ranging in number from between 10 to 14. Once the pulling lines are threaded through the traveler blocks of all of the towers, the pulling lines are secured to the respective pulling drums 34, 36 and 38 of the pulling machine 40.

FIGURE 1 illustrates one of the half-inch steel pulling lines 22 being manually threaded through the traveler block 24 of the last tower 10 of a series being strung. Ordinarily, the pulling lines are strung through a dozen or more towers at one time covering a distance of several miles. Reels 28, 30 and 32 are each capable of storing upwards of 16,000 feet of one-half inch diameter steel pulling cable. In FIGURE 2, the pulling lines are all threaded through the towers and are being drawn by a tractor 26 over to the pulling machine 40 for attachment to the pulling drums. The pulling lines may be individually strung through the towers by means of a tractor line 42 and a manual block and tackle assembly 44 as illustrated in FIGURE 1.

Figure 3:
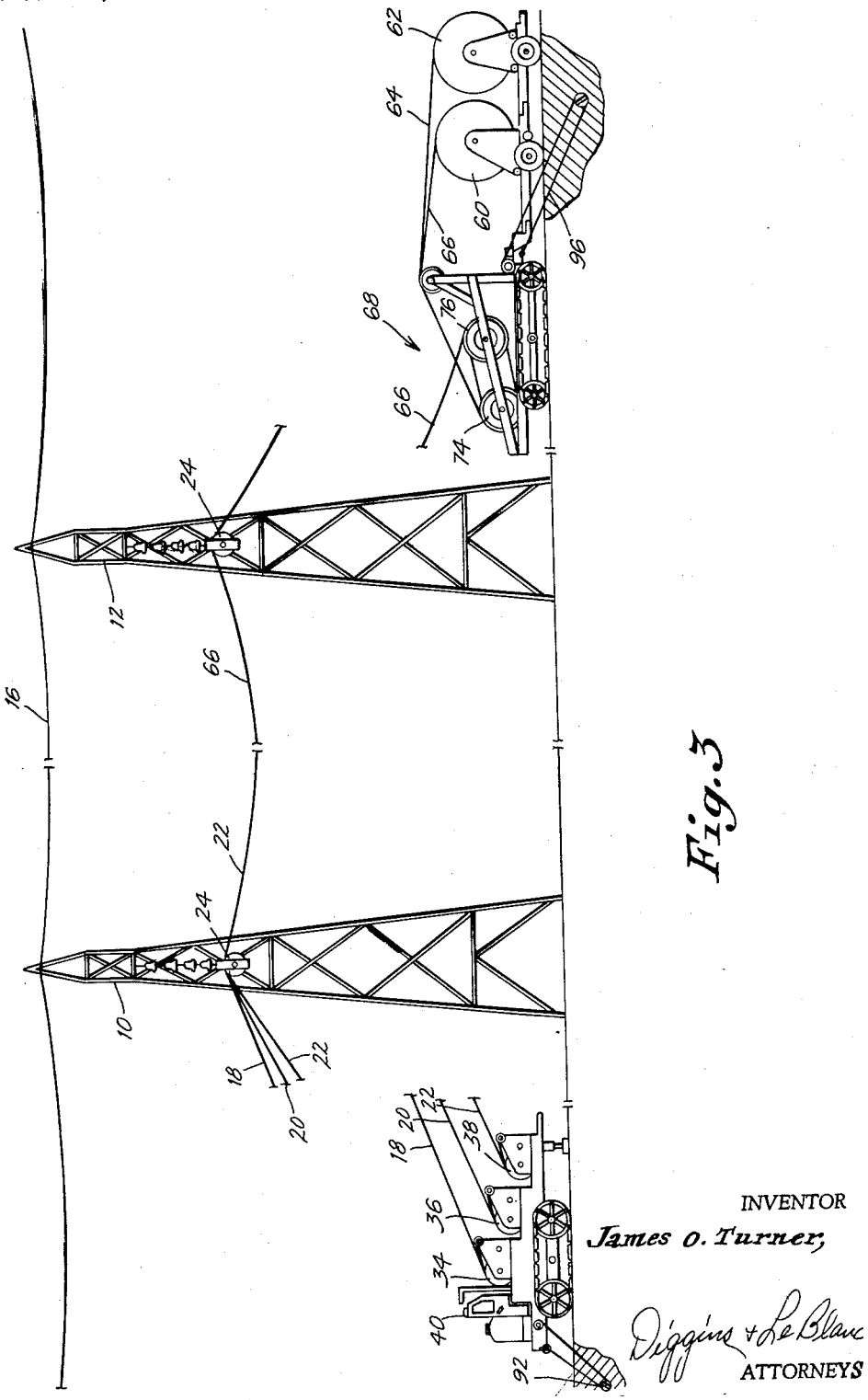
FIGURE 3 is an elevational view of the cable puller of the present invention.
Figure 4:
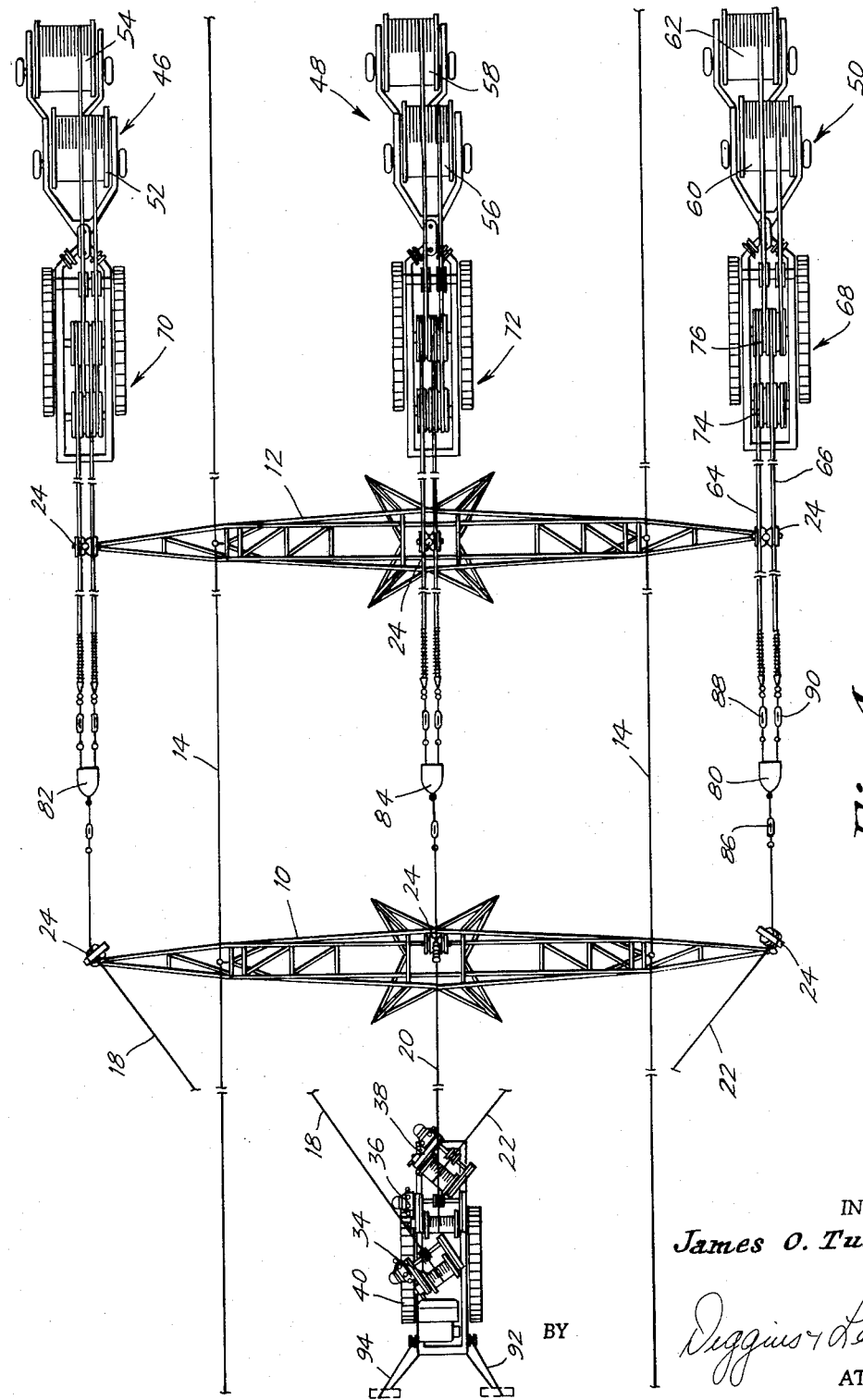
FIGURE 4 is a plan view of the apparatus shown in FIGURE 3.

FIGURES 3 and 4 illustrate the complete pulling assembly of the present invention with each of the pulling lines 18, 20 and 22 connected to the pulling machine 40. The reel trailers of FIGURES 1 and 2 are replaced in the system of FIGURES 3 and 4 by hydraulic payoff reel carriers 46, 48 and 50. Each of the payoff carriers comprises a pair of high voltage cable storage reels 52 and 54, 56, 58, 60—62. Two reels are provided for each pulling line since in the embodiment illustrated, each of the three electrical phases is carried by a pair of cables so that six cables in all are pulled by pulling machine 40 at one time. Each of the payoff reels 52, 54, 56, 58, 60 and 62 carries upwards of 16,000 feet of one-inch aluminum high voltage cable. As illustrated in FIGURES 3 and 4, the payoff reels are preferably supported on individual trailer mounts.

In FIGURE 3, the twin cables 64 and 66 are drawn off reels 60 and 62 and carry the first phase pulled by cable 22 by way of drum 38 of the pulling machine 40. Twin cables 64 and 66 are connected to the pulling line 22 through a hydraulic tension booster 68. The other phases are similarly connected to their respective pulling lines through identical tension boosters 70 and 72. Tension booster 68 comprises a pair of tension wheels 74 and 76 more fully described below, which tension wheels are hydraulically driven and provide means for controlling the tension on the pulling lines and on the high voltage electrical cables as they are drawn through the towers.

Twin cables 64 and 66 are connected to the pulling line 22 through a novel pulling sled 80 shown in FIGURE 4. The remaining two phases are similarly connected to the pulling lines 18 and 20 through similar pulling sleds 82 and 84. Pulling line 22 is connected to the front of the sled 80 through a suitable connection such as a conventional turnbuckle 86 and the high voltage cables 64 and 66 are connected to the sled 80 through similar connectors 88 and 90. The remaining phases are similarly connected.

Pulling machine 40 is preferably provided with a pair of ground anchors 92 and 94 and the payoff units comprising the payoff reels and the tension boosters are preferably similarly provided with ground anchors such as that indicated at 96 in FIGURE 3.

Figure 5:
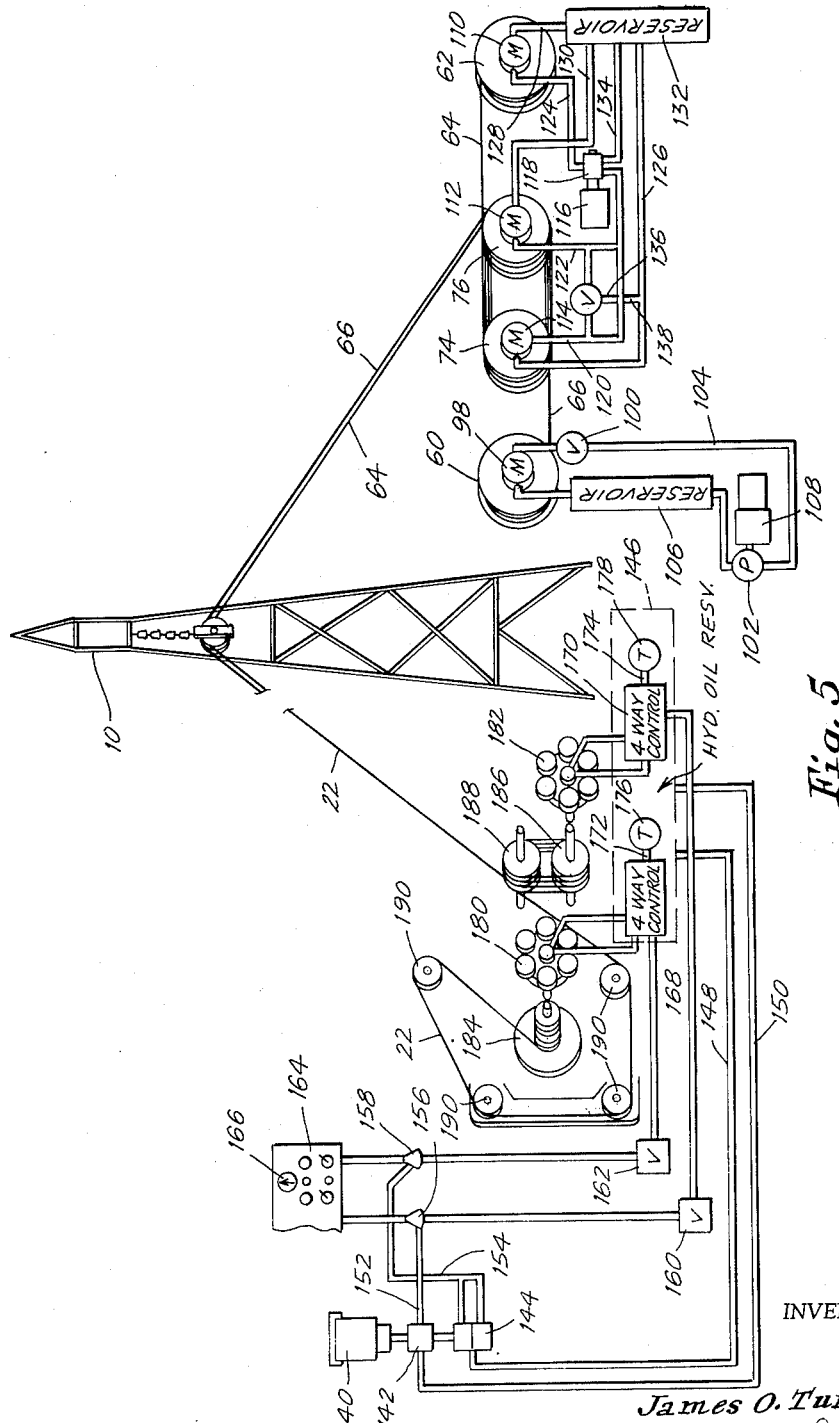
FIGURE 5 is a schematic view showing a hydraulic control system for a single pulling phase constructed in accordance with the present invention.

FIGURE 5 is a schematic diagram showing the overall hydraulic control system for the pulling machine of the present invention. While FIGURE 5 illustrates the hydraulic control for only a single pulling phase, it is understood that the control systems for the other two phases are identical to that shown in FIGURE 5.

Payoff reel 60 is controlled by means of a hydraulic motor 98 driven through a control valve 100 from a hydraulic pump 102 by way of conduit 104. Return for the hydraulic oil or other hydraulic fluid is through the oil reservoir 106 to the other side of the pump. Power for the hydraulic drive control originates from gasoline engine 108 or other suitable prime mover. Reel 60 is driven by a hydraulic motor 98 in a direction opposite to the direction of pulling movement of the cable so that the torque generated by motor 98 opposes the pulling force of the pulling machine 40. The torque generated in hydraulic motor 98 may be controlled by valve 100.

Payoff reel 62 and tension booster wheels 74 and 76 are similarly driven by hydraulic motors 110, 112 and 114 so that the torque on each wheel opposes the pulling torque of the pulling machine 40. Prime mover 116 drives hydraulic pump 118 which in turn supplies motive fluid to the hydraulic motors through conduits 120, 122 and 124. Return for the hydraulic oil or other fluid from each of the motors is by way of the conduits 126, 128 and 130 to the oil reservoir 132. Conduit 134 connects the oil reservoir to the inlet side of the pump 118. An automatic regulating valve 136 is preferably provided for controlling the torque applied to the tension booster reels 74 and 76 with a return line 138 coupled to return conduit 126. Suitable valving (not shown) in the supply lines to each of the motors 110, 112 and 114 serves to control the amount of torque applied by each of the respective reels. The separate prime movers 108 and 116 provide independent control for each of the two twin cables so that suitable adjustments may be made for unavoidable variations in the characteristics of the respective cables 64 and 66.

The prime mover 140 for the pulling machine preferably takes the form of a diesel motor and drives a pair of hydraulic pumps 142 and 144. In the embodiment described, pump 142 has a maximum hydraulic pressure of 1500 p.s.i. and a maximum capacity of 110 gallons per minute. Hydraulic pump 144 is operated at a maximum pressure of 2,000 p.s.i. and a maximum capacity of 140 gallons per minute. The inlet sides of pumps 142 and 144 are connected to a hydraulic oil reservoir indicated by dashed lines for the sake of clarity at 146. Connection is by way of conduits 148 and 150.

Pumps 142 and 144 are connected by conduits 152 and 154 to a pair of flow control valves 156 and 158 and a pair of pressure control valves 160 and 162. Valves 156, 158, 160 and 162 are pilot operated by means of suitable instruments on a control panel 164 in the cabin of the pulling machine 40. The control panel includes a tension control gauge 166 which provides a continuous visual indication of the tension on the cables passing through the towers.

Positioned alongside the hydraulic reservoir 146 are a pair of four-way control valves 168 and 170 connected by short lines 172 and 174 to the reservoir inlet fittings 176 and 178. Valves 168 and 170 control the flow to hydraulic motors 180 and 182. The four-way connection makes it possible to reverse the direction of rotation of either one or both of the motors 180 and 182.

Hydraulic motor 180 drives a demountable wire rope storage reel or drum 184 upon which the pull line 22 is wound. Between storage reel 184 and the last tower 10 is a grooved pulling wheel or drum driven by hydraulic motor 182. An idle and grooved pulling wheel 188 is suitably mounted adjacent the motor driven pulling wheel 186. The one-half inch pulling line 22 first engages idler wheel 188 and is sheaved around the grooved wheels 186 and 188 eight times. From the last winding around wheel 188 pulling line 22 passes over four threading sheaves labeled 190 to the take-up or storage reel 184.

Figure 6:
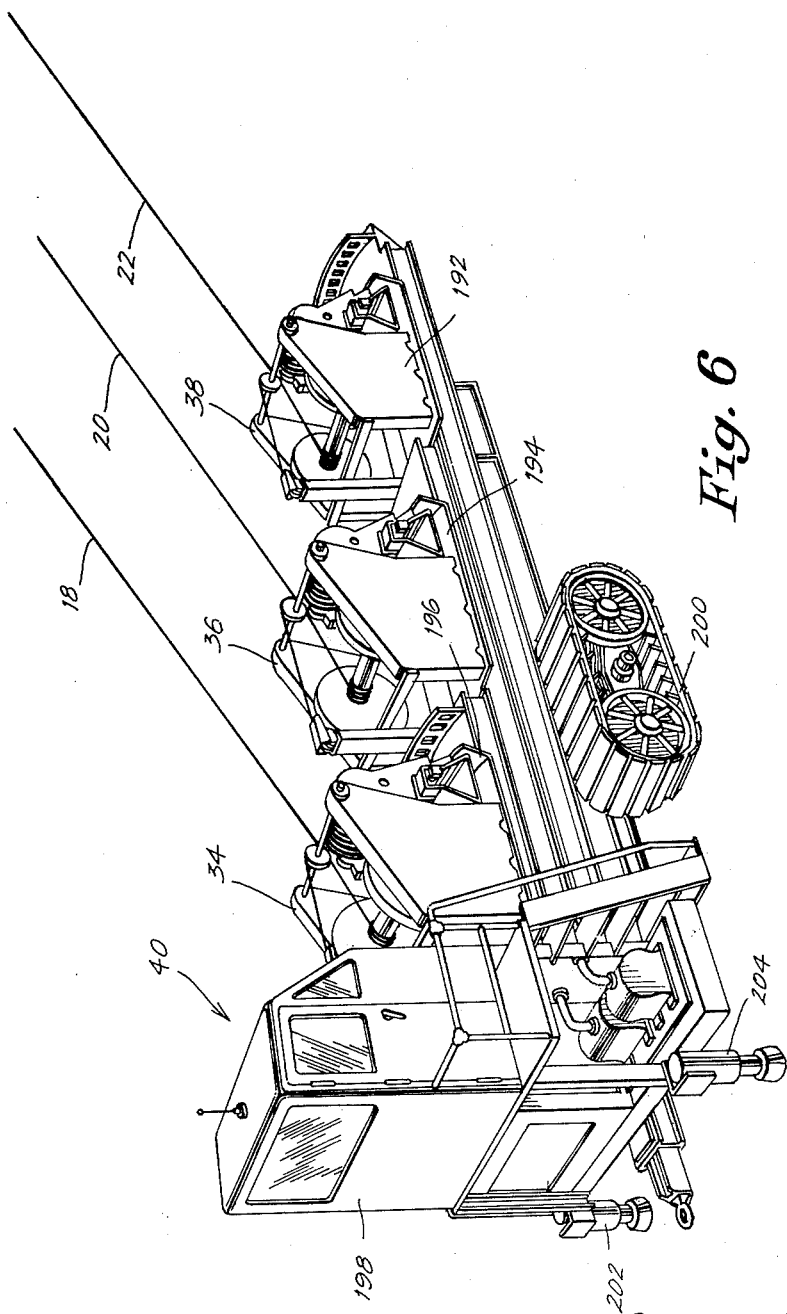
FIGURE 6 shows in perspective the pulling machine of the present invention.

FIGURE 6 is a perspective view of the pulling machine 40 showing the respective drums 34, 36 and 38 winding up the pull lines 18, 20 and 22. Each of the drums is preferably mounted on a rotatable stand 192, 194 and 196 so that the drums may be rotated to line up with the direction of pull from the traveler blocks. As shown in FIGURE 4, the central drum 36 is normally lined up with the center of the tower while the front and rear drums 38 and 34 are rotated on their platforms in opposite directions to line up with the traveler pulleys on each edge of the last tower.

Pulling machine 40 includes a cabin 198 housing the control panel 164 of FIGURE 5 from which the pulling operation is controlled. The entire unit is self-propelled being mounted on tracks 200 and including four leveling blocks, the two rear leveling blocks being indicated in FIGURE 6 at 202 and 204. A front leveling block 206 is visible in FIGURE 3.

Figure 7:
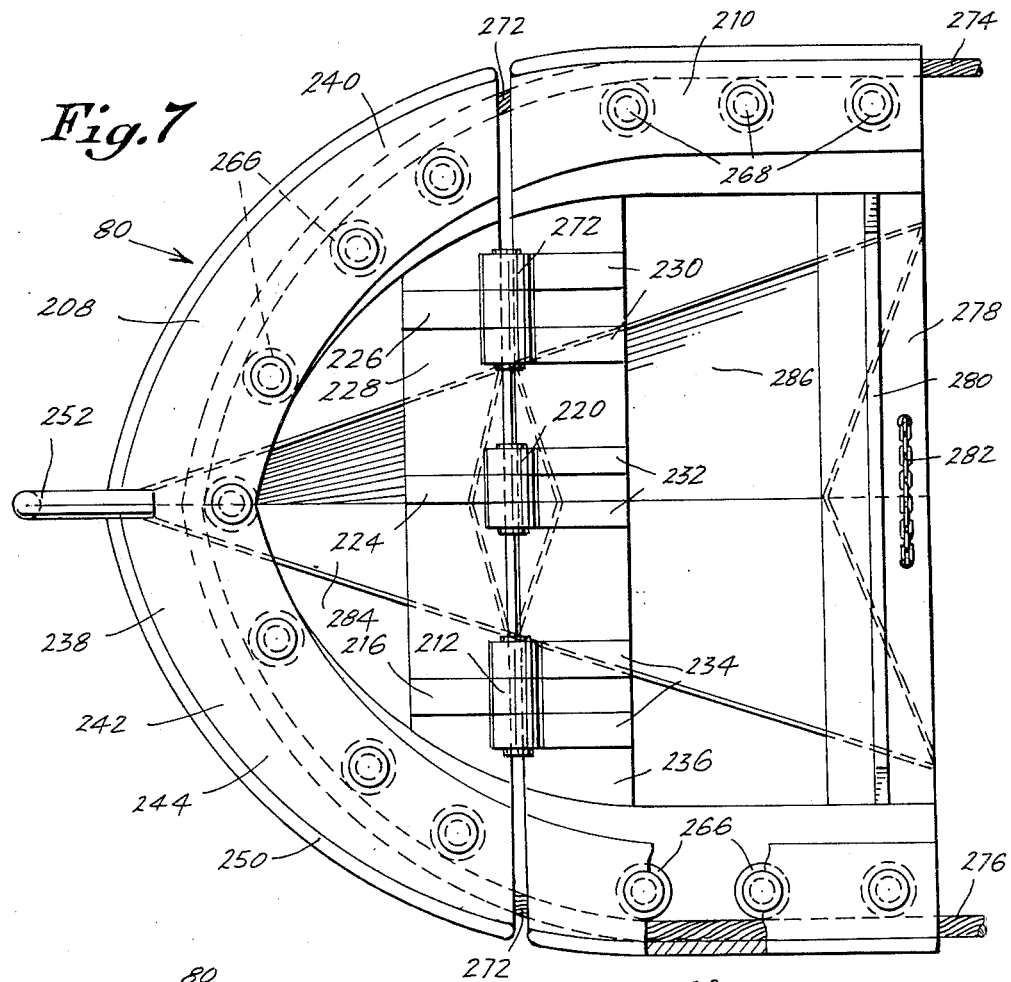
FIGURES 7 and 8 are plan and elevation views respectively of the pulling sled of the present invention.
Figure 8:
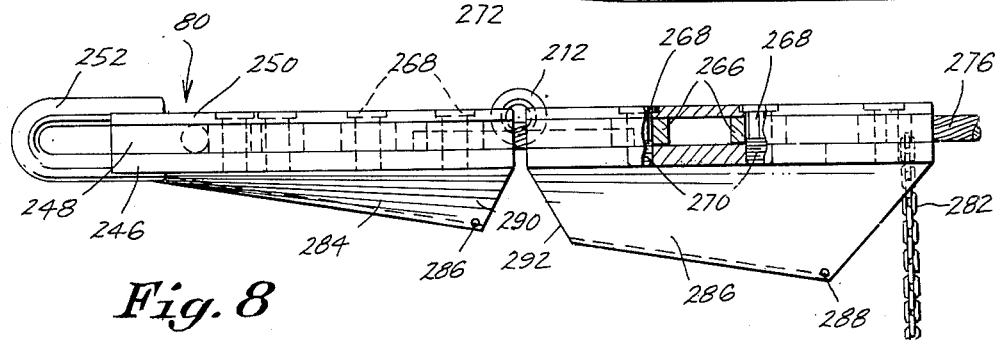

FIGURE 7 shows a plan view and FIGURES 8 and 9, side and rear elevations respectively of one of the novel pulling sleds of the present invention. While only the single sled 80 of FIGURE 4 is described in detail, it is understood that the remaining sleds 82 and 84 are of similar construction.

The sled 80 comprises a front section or tow section 208 and a rear section or slide 210. The tow and slide sections are joined by a hinge 212, a side view of which appears in FIGURE 10. Weld 214 is tested for 12,000 pounds pull and the rolled plate 216 forming the body of the hinge is tapped at 218 to provide for passage of a one-inch standard set screw. Additional hinges 220 and 222 complete the hinge connection between the tow and slide sections of the sled 80. Each of the front plates 216, 224 and 226 are welded to the top surface of a cross plate 228 extending across the rear of the tow section. Similarly, the rear hinge plates 230, 232 and 234 are similarly welded to the top surface of a cross plate 236 extending across the front of the slide section 210.

Tow section 208 comprises a bow 238 having curved rearwardly extending arms 240 and 242. The bow is defined by a top plate 244 best seen in FIGURE 9 and a bottom plate 246 joined by a side plate 248. Side plate 248 is joined to the top plate 244 by means of a peripheral weld 250 extending around the entire front edge of the tow section. Joined to the top plate 244 and the bottom plate 248 is a U-shaped pulling lug 252 to which the pulling cable is attached.

Rear or slide section 210 is similarly formed by a pair of top plates 254 and 256 forming extensions of the top plate 244 and by bottom plates 258 and 260 forming extensions of the bottom plate 246 of the tow section. Side bars or plates 262 and 264 are joined to the top plates by peripheral welds 267 and 268.

Spaced along a curved center line in both the tow and slide sections of sled 80 are a plurality of rollers 266 one and one-half inches in diameter and mounted on roller pins 268 counter sunk in the top plates 244, 254 and 256. The roller pins are threadably received at spaced points in the bottom plates of both the tow and slide sections as indicated at 270 in FIGURE 8.

Passing between the upper and lower plates and through both sections of the sled around the peripheral surface of the rollers is a sled cable 272 emerging from the opposite sides of the slide section at 274 and 276 as seen in FIGURE 7. Sled cable 272 is free to move along the surface of the rollers so as to automatically adjust the tension and even the pulling force to the two cables 64 and 66 of a pulled phase as illustrated in FIGURE 12.

The rear of the slide section of the sled is bridged by a flat cross plate 278 and an upright vertical reinforcing rib 280. A heavy timing chain 282 is passed through suitable apertures in cross plate 278 and hangs down a foot or two beneath the cross plate. Chain 282 is flexible in only a single direction, that is, in a direction parallel to the path of the sled, and provides a downwardly hanging weight which counteracts any tendency for the sled to twist or turn out of a horizontal plane.

Extending downwardly from the tow section 208 is a V-shaped trough 284 of gradually increasing cross section, with a drain hole 286 preferably provided at the lowermost portion of the trough. A similar trough 286 depends from the slide section 210 and constitutes a continuation of the tow section trough 284 with a gradually increasing cross section toward the rear of the sled. A suitable drain hole 288 is similarly provided in the rear trough 286. At the juncture of the tow and slide sections, the front and rear troughs are tapered as at 290 and 292 to provide clearance so that the tow and slide sections of the sled may pivot with respect to each other about the hinges 212, 220 and 222.

FIGURES 11, 12 and 13 illustrate the manner in which the sled 80 acts to position the high voltage cables 64 and 66 on the traveler blocks 24 as the sled is drawn over the towers. Each of the traveler blocks is provided with a central V-shaped groove 294 and a pair of smaller grooves 296 and 298 on opposite sides of the central V-shaped groove. As sled 80 passes over one of the traveler blocks 24, front trough 284 engages in the V-shaped groove 294. The sled is aligned with this groove by the fact that the pull lines 18, 20 and 22 are threaded through the traveler blocks so that they lie in the central V-shaped groove 294. The slide section 210 of the sled is permitted to pivot about the hinge structure as seen in FIGURE 13 to compensate for the slack of the cables between towers and particularly to compensate for the slack drag in the rear of the sled as the sled approaches a traveler block 24. Passage of front trough 284 through a traveler block brings rear trough 286 over the traveler block 24 so that rear trough 286 then rides in the central V-shaped slot 294. Sufficient clearance is preferably provided so that the sled passes through the traveler block support freely without engaging any of the tower structure other than the rollers 24. Passage of the slide section 210 through the traveler block automatically positions cables 274 and 276 and therefore high tension cables 64 and 66 in the outer slots 296 and 298 of the traveler blocks. As a result, the twin cables of each phase are adequately positioned and aligned and the supporting structure of the tower automatically as the cable is drawn through the tower structure. The traveler blocks are preferably lined with neoprene or similar material to prevent any scuffing of the cables.

It is apparent from the above that the present invention provides a novel pulling method and assembly particularly suited for pulling high voltage electrical cable. A closed system of machinery and equipment is provided to pull power and communication wires both above and below the ground. Although the invention is described in conjunction with the pulling of electrical cable, it has general application in fields such as metallurgy, plastics and the food industries. The main features of the present invention include the infinitely variable and automatically self-adjusting tensioning and speed control in conjunction with both forward and reverse drive directions. Tension control is maintained and controllable during stop, accelerating and decelerating conditions.

In the present invention, the pulling machine is designed so that positive control of the tension on the pulling lines is maintained under all pulling conditions. The tension on the pulling lines may be varied from zero to 10,000 pounds and once a pre-determined pulling force tension is set in at the control board or panel in the pulling machine cabin, the tension is automatically regulated to remain constant throughout the pulling operation. If the pulling lines become snarled so that a pulling force greater than the set value develops, automatic stopping devices may be provided.

The pulling speed may be infinitely varied for normal speeds ranging from zero to three miles per hour or faster. The speed and direction of pull are both controlled from the control board on the pulling machine. By varying the control tension at the pulling machine in conjunction with the reverse torque applied at the retarding equipment, a steady control forward or reverse motion can be effected as desired.

Each wire rope pulling line is reeved around two grooved reels such as reels 186 and 188 in FIGURE 5 with the former driven by a hydraulic pulling motor. In addition, each of the storage reels is driven by its own motor. This arrangement provides a booster for the pulling reels and assures accurate compact winding on the storage reel. The pulling drums or reels and respective storing reels are mounted on the chassis of the pulling machine 40 by rotatable tables so that they may be accurately aligned with the nearest traveling blocks through which the cable must pass.

The wire rope storage reels 184 in FIGURE 5 are removable and when the conductor or cable pull has been completed from one direction, the pull reels are replaced by empty reels. The pulling machine 40 is then turned around to pull conductors from the opposite direction while the full wire rope reels are moved ahead to be threaded through the route of the next pull and system setup. Each wire rope storage reel is capable of storing 16,000 feet of one-half inch steel cable ordinarily used for pulling lines.

The system of the present invention is particularly suited for stringing high voltage transmission line bundled conductors. The three unit pulling machine is capable of pulling all the three phases of bundled conductors at the same time and of maintaining a steady regulated and controlled tension on all the conductors during the entire pulling operation. Equalized tension on the conductors of a single phase is maintained through the use of the novel sled described. This sled performs the function of preventing any twisting of the conductors and places the conductors accurately in their respective grooves in a traveling block. The system of the present invention prevents any undesirable pre-stressing of the aluminum conductors and protects the high voltage conductor strands from scratches and nicks which might cause high corona losses and high radio noise levels in modern high voltage transmission lines. The controlled tension on the conductors allows them to be installed without their being dragged over the ground or scuffed over temporary supporting structures. The system keeps the conductors high in the air, thus reducing the hazards of traffic and of crossing over lower voltage power lines.

In operation, drag tension is maintained on the conductors as they are pulled through a series of towers by the tension booster such as is indicated at 68 in FIGURE 3, and schematically illustrated in conjunction with reels 74 and 76 in FIGURE 5. This is accomplished by use of hydraulic motors attached to the two large grooved neoprene lined reels 74 and 76. Each conductor is sheaved around these reels approximately four times before being attached to the pulling sled. The hydraulic motor for each of these reels is driven in a reverse direction to the direction of pull and then the pulling machine 40 overcomes the force exerted by hydraulic motors on these grooved reels, thus creating a pulling force. The tension booster creates a force opposite to that exerted by the pulling machine, thereby causing the conductors to be strung through the towers under a controlled tension. In addition to the retardation offered by the tension booster reels 74 and 76, the payoff reels 60 and 62 have their own hydraulic motors and these reels are also driven under a certain amount of tension while the conductors 64 and 66 are being fed to the booster reels. The payoff reels and the booster reels have their own individual prime movers and hydraulic systems so that they may be independently controlled.

While significant advantages are realized in the system of the present invention in terms of continuously variable control and increased power through the use of a completely hydraulic system, it is apparent that electric motor pulling and booster units as well as electric braking and similar apparatus may be employed if desired.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A cable pulling sled comprising a front tow section, a rear slide section hinged to said tow section, both said sections carrying a plurality of rollers mounted on spaced vertical axes, said axes being positioned along a curved loop whereby cable passing around said rollers enters and leaves the rear of said slide section along parallel lines, a V-shaped trough depending from each of said sections, said troughs gradually increasing in cross section from the front to the rear of said sled, and means for attaching a pulling line to the front of said tow section.

2. A cable pulling sled according to claim 1 including a timing chain flexible only in a direction parallel to the longitudinal axis of said sled suspended from the rear of said slide section.

3. A cable pulling sled according to claim 2 wherein the adjacent portions of said troughs are tapered outwardly and downwardly away from said hinge to provide clearance when said tow and slide sections flex about said hinge.

4. A cable pulling sled comprising a sled body carrying a plurality of rollers mounted on spaced vertical axis, said axis being positioned along a curved loop whereby a cable passing around said rollers enters and leaves the rear of said body along parallel lines, and means for attaching a pulling line to the front of said sled body, said sled body being transversely hinged to compensate for slack in the pulling line and the cable to be pulled.

5. A cable pulling sled comprising a sled body carrying a plurality of rollers mounted on spaced vertical axis, said axis being positioned along a curved loop whereby a cable passing around said rollers enters and leaves the rear of said body along parallel lines, means for attaching a pulling line to the front of said sled body, said sled body being transversely hinged to compensate for slack in the pulling line and the cable to be pulled, and depending weight means suspended below said sled body to prevent twisting of the pulling line and cable.

6. Cable pulling apparatus for simultaneously pulling a plurality of high voltage electric cables over a series of cable towers comprising, a pulling machine having a wind-up reel for each electric cable to be pulled, one end of each cable being connected to its respective wind-up reel, a pulling wheel operatively connected to each wind-up reel for feeding the cable from a tower to a respective wind-up reel, said wind-up reels and pulling wheels being pivotally connected to the pulling machine whereby they may be pivoted in a horizontal plane to thereby align each wind-up reel and pulling wheel with the direction of pull of the respective cable, a plurality of pay-off reels, the opposite end of each cable being connected to its respective pay-off reel, a plurality of wheels forming a tension booster operatively connected to each pay-off reel for tensioning said cable while being drawn from said pay-off reel to the tower, separate hydraulic motors operatively connected to each of the wind-up reels, pulling wheels, tension booster wheels and pay-off reels for controlling the tension on the cables as they are drawn through the towers.

References Cited in the file of this patent

UNITED STATES PATENTS

| | | |
|---|---|---|
| 980,220 | Eastman | Jan. 3, 1911 |
| 1,675,235 | Westhauer | June 26, 1928 |
| 1,718,355 | Hutchison | June 25, 1929 |
| 2,647,699 | Bush | Aug. 4, 1953 |
| 2,654,548 | Hopkins | Oct. 6, 1953 |
| 2,665,081 | Slomer | Jan. 5, 1954 |
| 2,705,114 | Worsham | Mar. 29, 1955 |
| 2,732,180 | Gratzmuller | Jan. 24, 1956 |
| 2,947,494 | Merritt | Aug. 2, 1960 |
| 2,948,483 | Petersen | Aug. 9, 1960 |
| 2,973,940 | Dence | Mar. 7, 1961 |
| 2,991,024 | Goode | July 4, 1961 |
| 3,000,588 | Brady | Sept. 19, 1961 |

FOREIGN PATENTS

| | | |
|---|---|---|
| 202,151 | Australia | June 13, 1956 |
| 1,080,382 | France | May 26, 1954 |